Patented Aug. 30, 1938

2,128,622

UNITED STATES PATENT OFFICE 2,128,622

METHOD OF PRODUCING UNSATURATED COMPOUNDS CONTAINING THE AETIO-CHOLANE RING

Leopold Ruzicka, Zurich, and Ludwig Ehmann, Basel, Switzerland, assignors to firm of Society of Chemical Industry in Basle, Basel, Switzerland No Drawing. Application May 2, 1936, Serial No. 77,642. In Switzerland May 4, 1935

5 Claims. (Cl. 260—397)

Naturally occurring mixtures of unsaturated sterols are in many cases only capable of separation when converted into halogen addition products. Thus stigmasterol and sitosterol are obtained by treating the crude phytosterol acetate with bromine, fractionally crystallizing the bromine addition products thus obtained, reproducing the double linking by debrominating the addition product by means of zinc and glacial acetic acid or by means of sodium amalgam or metallic sodium and saponifying the acetate thus obtained.

This protection of the double linking by addition of halogen proves also advantageous when, for synthetic or disintegrating purposes, compounds containing the aetiocholane nucleus have to be subjected to an oxidation process, for example, with chromic acid. Frequently, however, difficulty occurs in the reproduction of the double linking by the method described because of the sensitivity of the halogen addition products, which gives rise to the formation of undesired secondary products accompanied by resinification.

The invention relates to a method of producing unsaturated compounds containing the aetiocholane ring from their halogen addition products and consists in treating the halogen addition products, if desired in presence of an acid binding agent, with catalytically produced hydrogen preferably at the ordinary temperature. Surprisingly the reaction ceases after the halogen has been separated without saturation of the double linking produced. In consequence of the mild conditions of reaction secondary changes do not occur in the course of this dehalogenation and the yields are approximately quantitative. Obviously the double linking produced may subsequently be hydrogenated by energetic action of hydrogen, for example at a high temperature and under pressure.

As catalysts noble metals are to be preferred such as platinum or palladium or ordinary metals such as nickel or cobalt or mixtures of these metals with or without a carrier. Particularly in the presence of the common metals an addition of an acid binding agent is desirable, for example, an alkali hydroxide, an alkaline earth hydroxide, magnesia, an organic base or the like.

By the process of the invention the dihalides of cholesterol, sitosterol or lanosterol or their esters or ethers may be converted into the free unsaturated sterols or their derivatives, for instance, stigmasterol-acetate-tetrabromide into stigmasterol, cholestenone dibromide into cholestenone, dehydroandrosterone-dibromide into dehydroandrosterone or pregnendione-dibromide into pregnendione. In like manner the halogen addition products of unsaturated bile acids or sapogenine may be converted into halogen-free compounds with restitution of the double linkings.

The following examples illustrate the invention, the parts being by weight:—

*Example 1*

5.5 parts of cholesterol dibromide are dissolved in a mixture of 150 parts of ether and 50 parts of glacial acetic acid; there are added 2.5 parts of a palladium-barium-sulfate-catalyst of 4 per cent. strength and the mixture is shaken with hydrogen in the usual manner at 20–25° C. under a pressure of 200 cm. water column. Vigorous absorption of hydrogen begins at once and comes to an end after the absorption of 1 mol. The mixture is filtered, the clear filtrate is freed from ether and from the remaining acetic acid solution the cholesterol is precipitated by cautious addition of water. It melts at 146–147° C. and is produced in approximately quantitative yield.

In an analogous manner platinum black may be used.

*Example 2*

20.3 parts of cholesterol-acetate-dibromide and 15 parts of a nickel catalyst of 30 per cent. strength are suspended in 200 parts of absolute alcohol. 5 parts of caustic soda are added and the mixture is shaken in the usual manner with hydrogen. The reduction sets in at once with slight development of heat and in a short time is finished after 1 mol. of hydrogen has been consumed. The alkaline solution freed from catalyst is boiled under reflux for 1 hour to saponify the ester and then mixed with water until permanent turbidity is produced. On cooling the cholesterol crystallizes in approximately quantitative yield in the form of fine snow-white needles which melt at 146–147° C.

As catalysts there may be used instead of nickel catalysts also cobalt, iron and copper catalysts or mixtures of these.

*Example 3*

40 parts of stigmasterol-acetate-tetrabromide and 50 parts of a nickel catalyst of 30 per cent. strength are added to a solution of 12 parts of caustic soda in 20 parts of water and 500 parts of alcohol and the whole is shaken with hydrogen. Over 90 per cent. of the calculated quantity of hydrogen is absorbed in the first hour and after a further hour the reduction is finished. For the saponification of the stigmasterol-acetate the clear solution freed from catalyst is boiled for an hour in a reflux apparatus. If the still hot solution is mixed with water until permanent turbidity is observed the stigmasterol is precipitated on cooling in the form of a snow-white fine crystalline mass. After several recrystallizations from alcohol the melting point is 167–168° C.

*Example 4*

40 parts of sitosterol-acetate-di-bromide, 5 parts of a nickel cobalt catalyst and 10 parts of caustic potash are suspended in 400 parts of alcohol. On shaking with hydrogen the reaction begins at once and in a short time is complete, after absorption of the necessary quantity of hydrogen. The mass is worked up in the usual way and sitosterol is obtained in nearly quantitative yield; its melting point is 136–137° C.

Likewise for instance 3-epi-hydroxy-$\Delta^{4,5}$-aetio-allocholanic acid may be produced from a dihalogenide of 3-epi-acetoxy-$\Delta^{4,5}$-aetio-allocholanic acid ethyl ester.

Instead of caustic potash for instance calcium hydroxide, magnesia, piperidine or diethylamine may be used.

*Example 5*

20 parts of the neutral body obtained by working up the product of the reaction of cholesterol-acetate-dibromide with chromic acid in glacial acetic acid are dissolved in 200 parts of absolute alcohol. 30 parts of nickel catalyst of 30 per cent. strength and 10 parts of caustic potash of 50 per cent. strength are added and the whole is shaken with hydrogen. In a short time the absorption of hydrogen is complete. To the solution freed from catalyst, semi-carbazide-acetate is added and from the semi-carbazone there is obtained, by saponification with strong alcoholic sulfuric acid, the dehydroandrosterone in two polymorphous forms of melting point 141–142 and 152–153° C. respectively.

In a similar manner pure dehydroandrosterone-dibromide can be converted into dehydroandrosterone or progesterone-dibromide into progesterone. Instead of the bromides for instance the chlorides may be used.

What we claim is:—

1. A method of producing compounds containing the aetiocholane ring from their halogen addition products, which comprises catalytically hydrogenating the halogen addition product without the addition of heat in the presence of a hydrogenating metal catalyst.

2. A method of producing compounds containing the aetiocholane ring from their halogen addition products, which comprises catalytically hydrogenating the halogen addition products without addition of heat in presence of an acid binding agent and of a hydrogenating metal catalyst.

3. A method of producing compounds containing the aetiocholane ring from their halogen addition products, which comprises catalytically hydrogenating the halogen addition products in presence of an acid binding agent at normal room temperature and in the presence of a hydrogenating metal catalyst.

4. A method of producing compounds containing the aetiocholane ring from their halogen addition products, which comprises catalytically hydrogenating the halogen addition products in presence of an acid binding agent at normal room temperature, and in presence of metals of the eighth group of the periodic system as catalysts.

5. A method of producing compounds containing the aetiocholane ring from their halogen addition products, which comprises catalytically hydrogenating the halogen addition products in presence of an acid binding agent at normal room temperature, and in presence of nickel as catalyst.

LEOPOLD RUZICKA.
LUDWIG EHMANN.